United States Patent [19]

Braginetz et al.

[11] 4,219,935

[45] Sep. 2, 1980

[54] FIXTURE FOR USE IN ALIGNING MULTIPLE CONTACTS OF RECEIVER UNITS IN COMPUTER INTERFACE EQUIPMENT

[75] Inventors: Paul A. Braginetz, Staunton; Grady M. Powers, Mt. Sidney; Kimball E. Stowers, Ft. Defiance, all of Va.

[73] Assignee: Virginia Panel Corporation, Waynesboro, Va.

[21] Appl. No.: 973,959

[22] Filed: Dec. 28, 1978

[51] Int. Cl.³ .................. G01B 3/30

[52] U.S. Cl. .................. 33/174 R; 33/180 R; 29/857; 113/119

[58] Field of Search .................. 29/629, 747; 113/119; 33/180 R, 181 R, 174 R

[56] References Cited

U.S. PATENT DOCUMENTS 3,219,308 11/1965 Halstead .................. 33/180 R X

*Primary Examiner*—William D. Martin, Jr.

*Attorney, Agent, or Firm*—B. P. Fishburne, Jr.

[57] ABSTRACT

A precision rectangular fixture frame includes top, bottom and grooved side members. A middle bar of the frame parallel to the top and bottom members has a pair of recesses aligned with opposing recesses in the top member whereby a single vertical bar having a pair of spaced notches can be interlocked with the top member and middle bar of the frame in two positions of use parallel to the side members. The vertical bar is grooved in its opposite sides whereby in each position of use of the vertical bar one of a pair of contact gage and alignment bars can be supported at plural elevations on the fixture frame during servicing of successive ranks of contacts in two distinct areas of an upper tier of contacts in a receiver. A third contact gage and alignment bar is employed without the vertical bar and is engaged with grooves of the frame side members at plural elevations during servicing of successive ranks of contacts across a lower tier of contacts in the receiver.

15 Claims, 18 Drawing Figures

FIG. 1
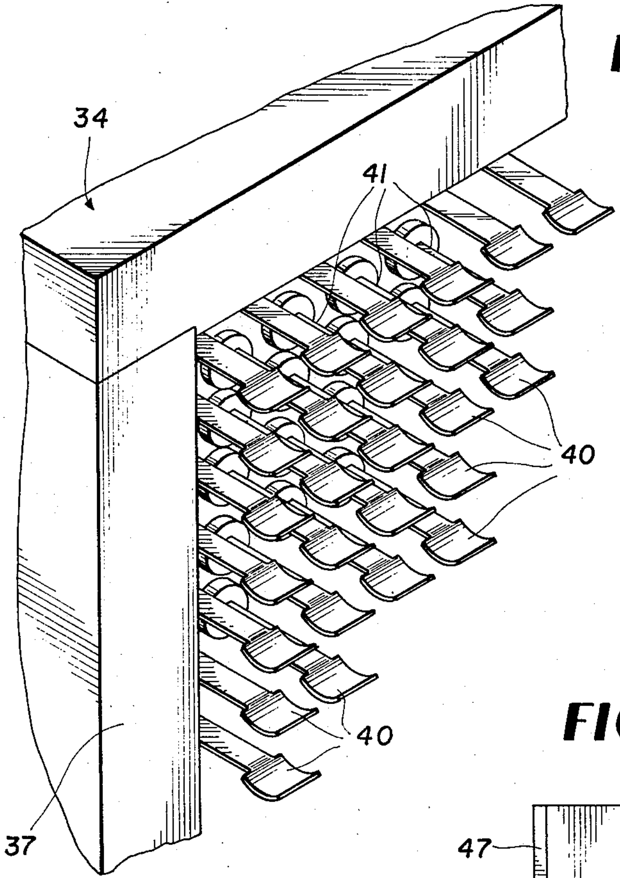
FIG. 10
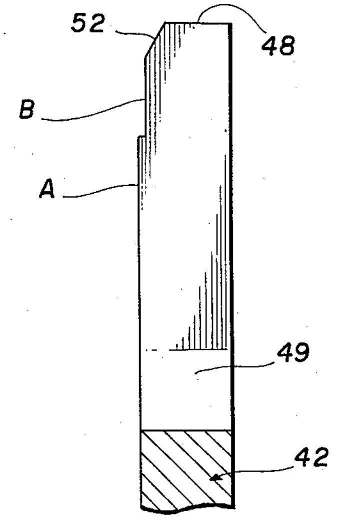
FIG. 7
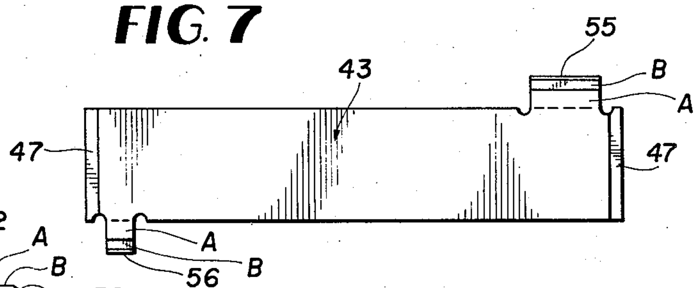
FIG. 9
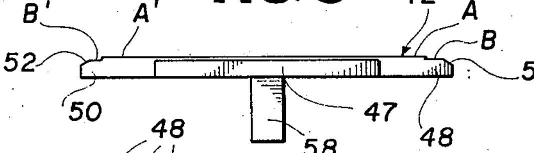
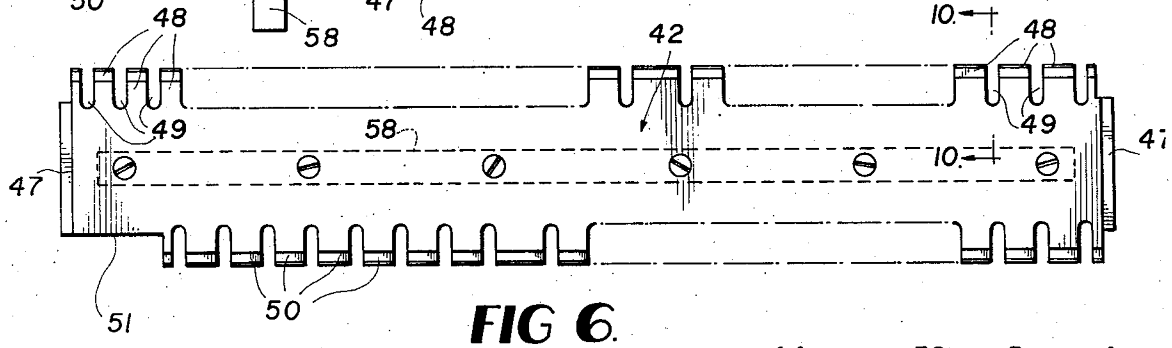
FIG 6.
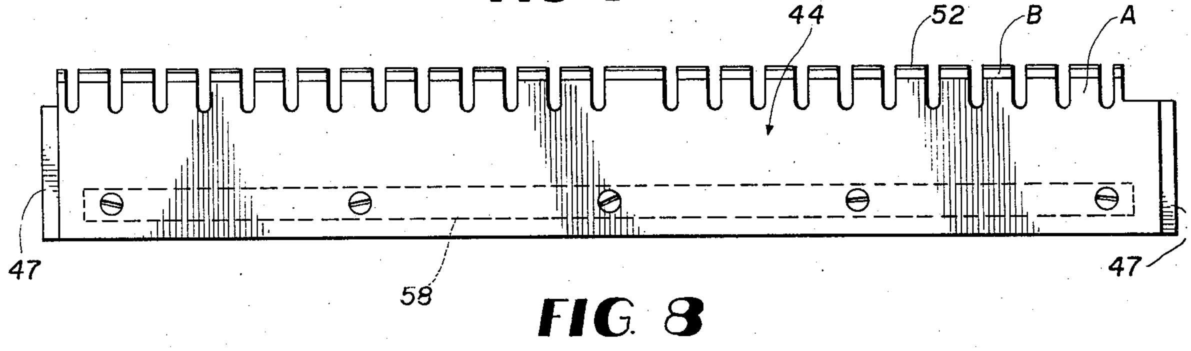
FIG. 8

FIG. 11
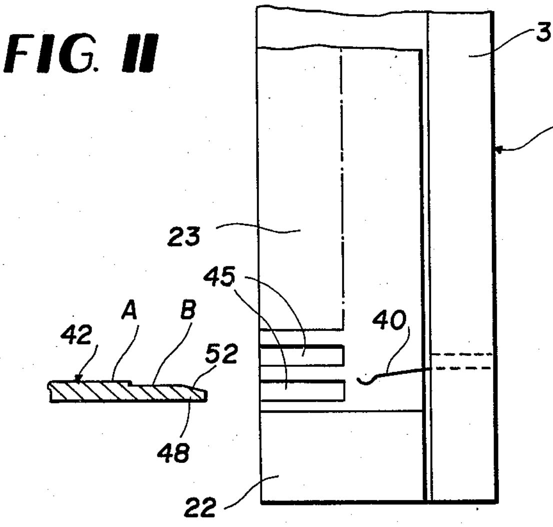
FIG. 14
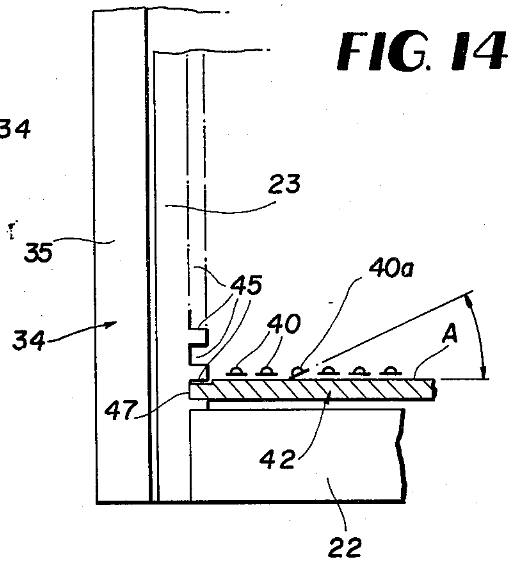
FIG. 12
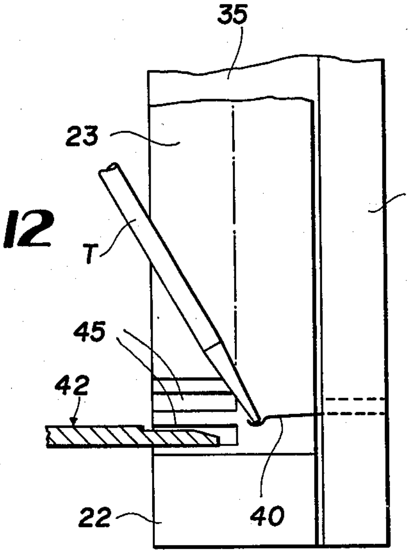
FIG. 15
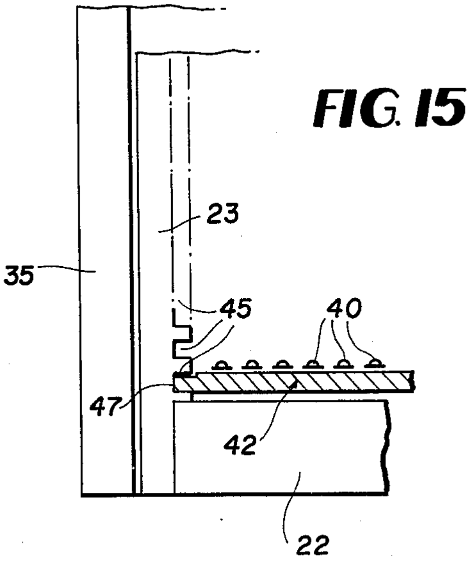
FIG. 13
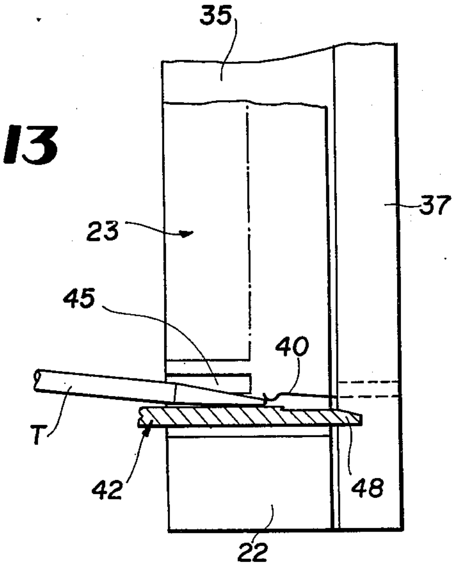
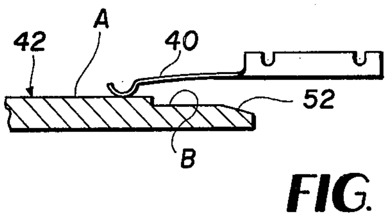
FIG. 16
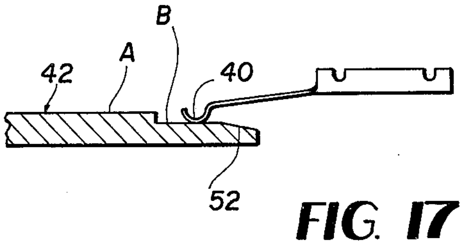
FIG. 17

FIXTURE FOR USE IN ALIGNING MULTIPLE CONTACTS OF RECEIVER UNITS IN COMPUTER INTERFACE EQUIPMENT

BACKGROUND OF THE INVENTION

This invention arises as a result of a compelling need in the art for a means to realign contacts of receivers in the field where misalignment or damage to such contacts has taken place due to usage. Heretofore, because receivers have complex numbers of paddle contacts, variations in contact spacing and intermixing of paddle contacts with coaxial contacts in the same receiver unit, field servicing has been virtually impossible and receivers must be returned to the manufacturer for maintenance, resulting in very high costs and loss of valuable time related to test procedures on sophisticated systems, such as found in the aerospace industry and elsewhere.

Receiver units of the type involving the present invention are a part of computer interface equipment. To keep such receivers fully operational in the field, an alignment fixture forming the subject matter of this invention has been devised. The alignment fixture is characterized by precision with simplicity and convenience of use in the field. It possesses the necessary flexibility to make possible and practical the field maintenance of receivers which have varying numbers and center-to-center spacing of paddle contacts in different zones of the receiver and intermixing of paddle contacts with coaxial contacts in certain areas or zones. These factors and others have made field servicing virtually impossible prior to the invention, and the objective of the invention is to deal with this problem in a complete and efficient manner with comparative economy and convenience.

The following prior United States patents are made of record herein under 37 C.F.R. 1.56:

U.S. Pat. No. 3,333,235
U.S. Pat. No. 3,406,369
U.S. Pat. No. 3,419,842.

These referenced prior patents are petinent only in the sense that they depict somewhat the class of equipment which the invention has been created to service in the field. These prior patents do not, however, disclose any means for carrying out the servicing or maintenance in the field. More particularly, U.S. Pat. No. 3,419,842 shows a relatively fixed panel or receiver possessing multiple contacts and therefore shows the kind of equipment to which the invention is addressed.

SUMMARY OF THE INVENTION

The present invention consists of a precision rectangular fixture frame having a fixed middle bar parallel with two members of the fixture frame, and a releasably held bar extending at right angles to the middle bar and said two members and having two distinct positions of use on the fixture frame. The releasable or movable fixture bar has interfitting positive engagement with the middle bar and one of said two members. The movable fixture bar is further held in its use position by yielding detent means. The movable bar and the two fixture frame members parallel thereto are grooved to receive and support contact alignment or gage bars at various positions on the fixture frame so that the ranks of paddle contacts on a receiver in the field can be expeditiously realigned or replaced, as required, in an economical manner. Without the innovation of the middle bar of the fixture frame and the releasably held movable bar, adjusting to the spacing requirements of the alignment bars and other variables, it would not be possible on a practical basis to adjust paddle contacts of receivers in the field.

Other features and advantages of the invention will become apparent during the course of the following detailed description.

BRIEF DESCRIPTION OF THE DRAWINGS

FIG. 1 is a fragmentary perspective view of a receiver having multiple ranks and files of paddle contacts intervened in some areas by coaxial contacts.

FIG. 6 is a plan view of a first form of contact alignment bar utilized with the alignment fixture frame.

FIG. 7 is a plan view of a second form of contact alignment bar.

FIG. 8 is a plan view of a third form of contact alignment bar.

FIG. 9 is a typical end elevation of a contact alignment bar.

FIG. 10 is an enlarged fragmentary vertical section taken on line 10—10 of FIG. 6.

FIGS. 11 through 17 are fragmentary elevational views, partly in section, depicting the use of the invention.

DETAILED DESCRIPTION

Figure 3:
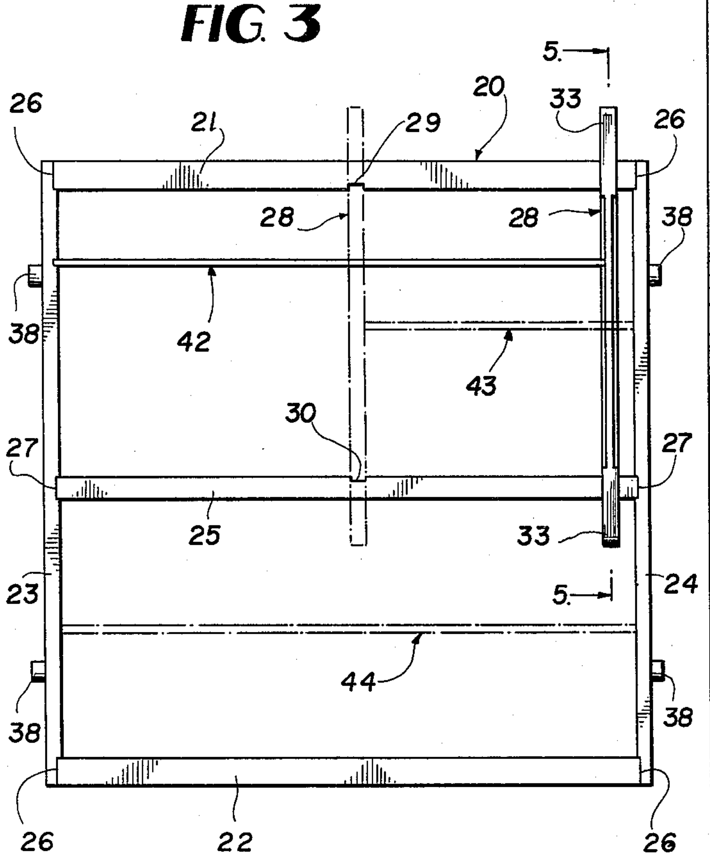
FIG. 3 is a front elevational view of the alignment fixture frame depicting its usage.

Referring to the drawings in detail, wherein like numerals designate like parts, a metal precision machined substantially rigid rectangular fixture frame 20 comprises upper and lower bars 21 and 22, side rails 23 and 24, and a middle bar 25 parallel to the upper and lower bars 21 and 22. As shown in FIG. 3, the side rails 23 and 24 are recessed on their inner sides and at their opposite ends as shown at 26 to firmly seat the ends of the bars 21 and 22. The side rails 23 and 24 are further recessed at their longitudinal centers, as at 27, to seat the ends of the middle bar 25. The several bars 21 through 25 are connected in rigidly assembled relationship by suitable screws, not shown.

The rectangular fixture frame 20 is used in a manner to be fully described with a single vertical bar 28 having two positions of use on the frame 20. The two positions of use of the vertical bar 28 are illustrated in full lines and broken lines in FIG. 3. To accommodate the vertical bar 28 in its two positions of use, the upper bar 21 and the middle bar 25 are provided in their opposing faces with vertically aligned recesses 29 and 30. One vertically aligned pair of the recesses 29 and 30, FIG. 3, are located at the lateral center of the frame 20 while the other pair of recesses 29 and 30 are near and inwardly of the side rail 24, for a reason to be described.

Figure 5:
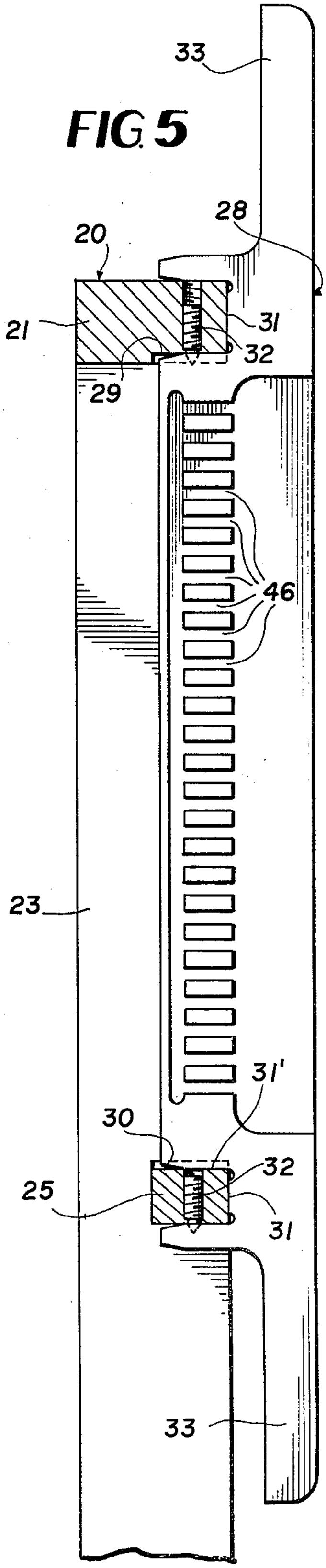
FIG. 5 is an enlarged fragmentary vertical section taken on line 5—5 of FIG. 3.
Figure 10A:
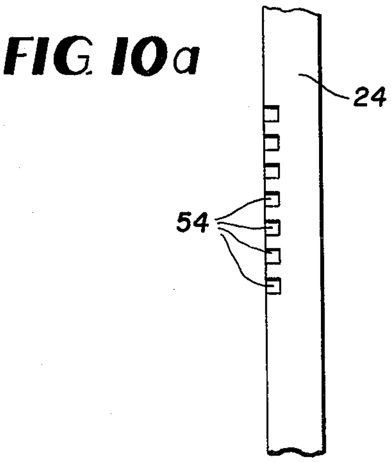
FIG. 10A is a fragmentary elevational view of one fixture frame side rail.

The vertical bar 28 is provided near its opposite ends and in its forward side, with relation to the frame 20, with a pair of notches 31 which are sized to receive the upper and middle bars 21 and 25 at their recesses 29 and 30, as shown in FIG. 5. The vertical bar 28 can thus be interlocked precisely with the frame bars 21 and 25 in either of its two positions of use shown in FIG. 3. The vertical bar 28 is firmly and releasably held in assembled relationship with bars 21 and 25 in both use positions by pairs of downwardly facing vlier plungers or detents 32 held in the bars 21 and 25, as best shown in FIG. 5. These spring-urged plungers will yield to allow separation of the vertical bar 28 from frame bars 21 and 25 when sufficient finger pressure is applied to finger grip extensions 33 on each end of the vertical bar. The machining tolerances on the interengaging parts, FIG. 5, are such that the middle bar 25 is in precision registration with the roof 31' of notch 31 of the vertical bar. The upper bar 21 is not employed for registration.

The invention, as previously explained, is utilized in the field servicing of receivers which form parts of computer interface equipment and the like. The invention is not restricted in its use to a single type of receiver, and one of the main virtues of the invention is its flexibility or versatility which enables it to be used in servicing a variety of receiver configurations. For the sake of illustration, a typical receiver 34 has been shown in FIGS. 1 and 2. This receiver is generally like the receiver shown in the above-referenced U.S. Pat. No. 3,419,842. It is of rectangular form and includes vertical side members 35 and 36 and a main body portion 37 between these side members. The alignment fixture frame 20 is adapted to engage closely between the side members 35 and 36 substantially in face-to-face relationship with the receiver body portion 37 during the use of the invention. In the use position, side bearing elements 38 on the frame 20 are first engaged with supports 39 on the receiver 34 and are then caused to enter and rest in notches 39' of the receiver. Following this, the customary handle 40' at one side of the receiver 34 is rotated to lock the fixture frame 20 in the use position on the receiver in a manner well known in the art.

The receiver 34 includes multiple horizontal ranks and vertical files of paddle contacts 40 which project forwardly of the receiver body portion 37. In some areas of the receiver, a number of coaxial contacts 41 may be intermixed with the paddle contacts 40 and the arrays of these elements will vary from receiver-to-receiver. The invention has the ability to accommodate these variations in contact arrangement from receiver-to-receiver, as will be further explained.

In the field servicing of the receiver 34 or other receivers, the fixture frame 20 and the releasable vertical bar 28 are employed in conjunction with several types of contact alignment bars designated 42, 43 and 44 in FIGS. 6, 7 and 8. These alignment bars are employed one at a time as gaging elements to assist the field service personnel in checking on the alignment or misalignment of the paddle contacts 40 in different tiers or zones of the receiver, so that those contacts which have become misaligned or damaged can be realigned or replaced, if necessary. For example, referring to FIG. 3, a first upper zone of the receiver 34 is serviced by positioning the vertical bar 28 at the full line position near the side rail 24 utilizing the two aligned recesses 29 and 30 near this rail in the previously-described manner. The contact alignment bar 42 is utilized to service the paddle contacts 40 in this first upper zone of the receiver between the bars 21 and 25 and between the side rail 23 and the vertical bar 28, FIG. 3.

For the purpose of supporting the first alignment bar 42 at plural precise elevations corresponding to the vertical spacing of the horizontal ranks of paddle contacts 40 in the first upper zone, the side rail 23 of frame 20 is provided on its interior face and leading edge with a plurality of equidistantly vertically spaced grooves 45 in the region between the bars 21 and 25, and the vertical bar 28 is similarly provided in its side face opposing the rail 23 with a corresponding number and spacing of grooves 46 also in the region between the frame bars 21 and 25. The vertical spacing of the grooves 45 and 46 also corresponds to the spacing of the horizontal ranks of contacts 40 on the receiver.

The alignment bar 42 shown in FIG. 6 has opposite end support tongues 47 formed thereon to engage in laterally aligned pairs of the grooves 45 and 46 of side rail 23 and vertical bar 28, so that the alignment bar 42 can be positioned progressively at plural elevations to check the alignment of paddle contacts 40 in all ranks of contacts in the first upper zone of the receiver.

For one common commercial receiver type requiring field service, the alignment bar 42, FIG. 6, is provided along one longitudinal edge thereof with a certain array of teeth 48 intervened by equal width slots 49, whereby the portions or teeth 48 will be aligned during use with the vertical files of paddle contacts in the first upper zone of this one particular receiver.

On the opposite longitudinal edge portion of the alignment bar 42, a specifically different array of teeth 50 is provided, including a blank space 51. This allows the alignment bar 42 to be reversed end-for-end in the same plane followed by the insertion of its opposite edge in the fixture frame so that a second type of receiver can be serviced in the field. In this second use mode of the alignment bar 42, the particular location of teeth 50 and the blank space 51 enables the bar to avoid interference with coaxial connectors of the receiver. In this connection, it should be understood that various forms of contact alignment bars may be devised for use in the invention to allow field servicing of a wide range of receiver types. It should also be mentioned that, when the alignment bar 42 or any other alignment bar is mounted for use, its end tongues 47 should be slid fully forwardly in the respective grooves 45 and 46, until the ends of the tongues abut the closed end walls of the grooves.

Referring to FIG. 9 which shows a typical end profile of any of the alignment bars 42, 43 and 44, along the opposite toothed edge portions of the bar, pairs of flat stepped alignment surfaces A, B, A' and B' are provided for a reason to be described. The opposite longitudinal edges of each alignment bar are beveled at 52.

The second type of contact alignment bar 43 shown in FIG. 7 is utilized to align paddle contacts in a second upper zone of the receiver 34 having the coaxial contacts 41 intermixed with paddle contacts 40. When the alignment bar 43 is used, the vertical bar 28 of the fixture frame is removed by hand from its first use position shown in full lines in FIG. 3 and re-engaged with the frame bars 21 and 25 at the recesses 29 and 30 adjacent to the center of the fixture frame. The vertical bar 28 remains fixed and stable in either use position.

To receive and support the second alignment bar 43 at the proper multiple elevations to check the alignment of all ranks of paddle contacts in the second upper zone of the receiver, equidistantly spaced grooves 43 are provided on the side of the vertical bar 28 away from its grooves 46 and in the center region of the vertical bar.

Figure 2:
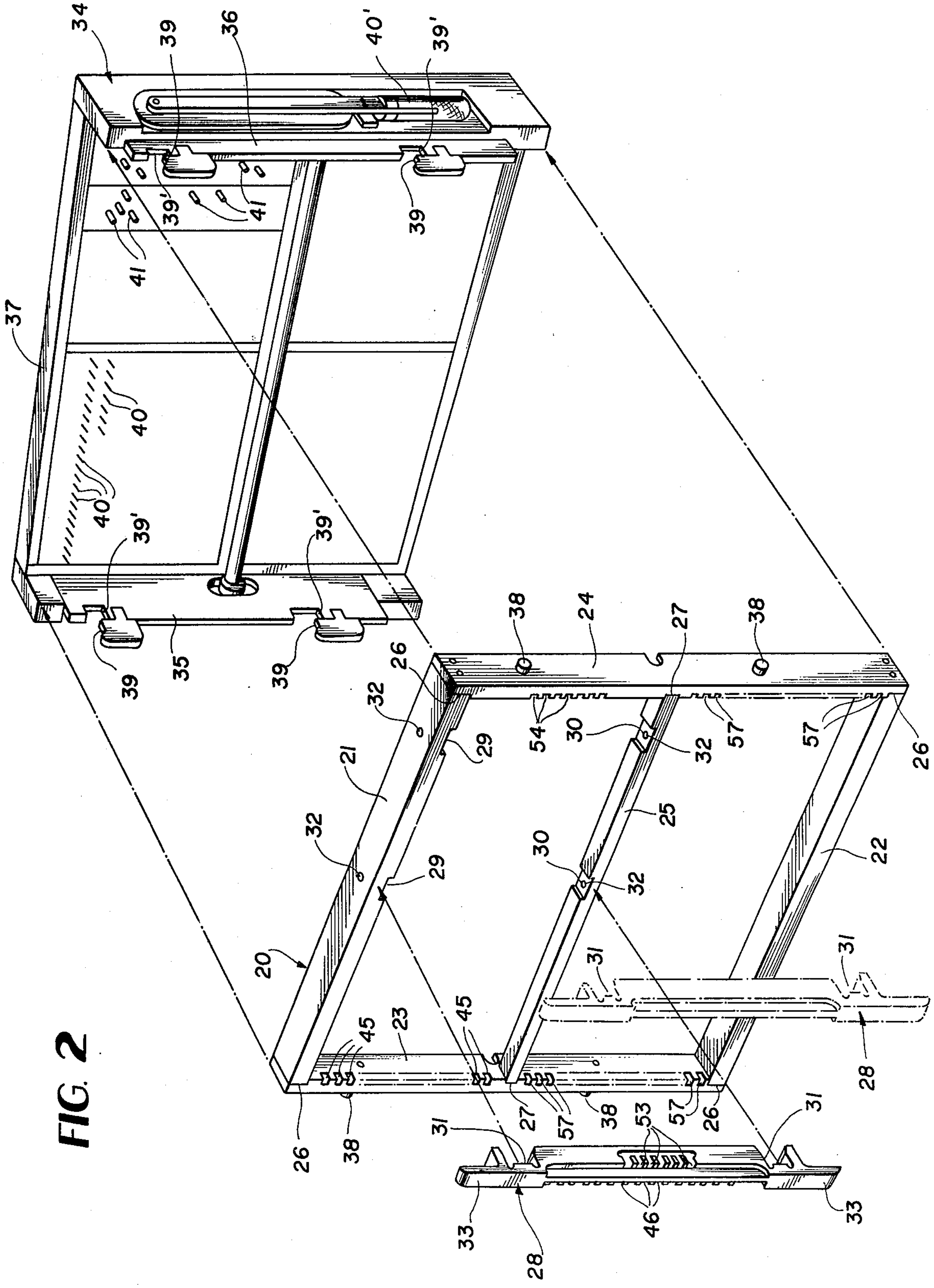
FIG. 2 is an exploded perspective view of a typical receiver and the alignment fixture frame in accordance with the invention.
Figure 4:
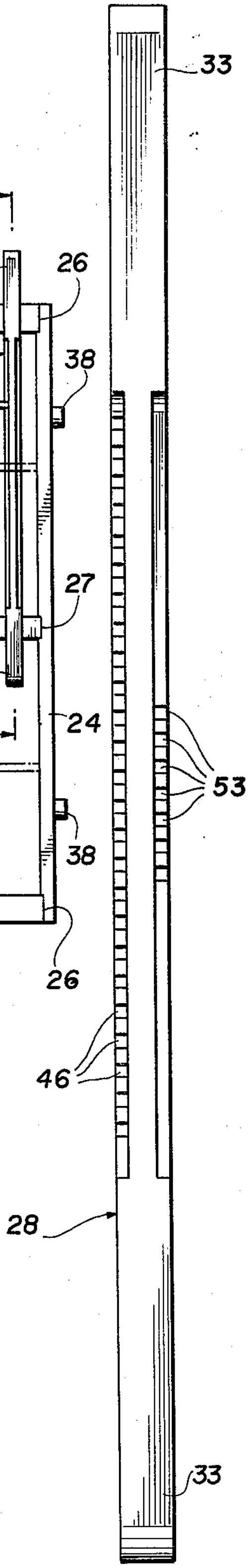
FIG. 4 is an elevational view of a releasably held multi-position bar utilized with the alignment fixture frame.

As observed in FIGS. 2 and 3, the grooves 53 are in the right hand side of the vertical bar 28. A coacting group of equidistantly spaced grooves 54 is provided on the interior side of the right hand vertical side rail 24 at the proper elevations to support the second alignment bar 43 at necessary levels in the second upper zone of the receiver 34. The grooves 53 and 54 are disposed in horizontally aligned pairs to support the alignment bar 43 in level positions when its end tongues 47 are engaged in respective pairs of the grooves 53 and 54.

A significant feature of the invention is its ability to facilitate the adjustment of paddle contacts which may be obstructed, as where nested among coaxial terminals. Furthermore, in a practical situation, the rank and file spacing of paddle contacts 40 in the main is set at 0.281 inch while the paddle contacts nested among the coaxial terminals are spaced 0.250 inch apart. In relation to the drawings, the grooves 45 and 46 of side rail 23 and vertical bar 28 would therefore be spaced 0.281 inch apart while the grooves 53 and 54 of the vertical bar and side rail 24 would be spaced apart 0.250 inch. The alignment bars 42 and 44 that are used in the main areas of the receiver are therefore positioned out of phase with the requirement of the 0.250 spacing. This again evidences the adaptability or flexibility of the invention. Since a receiver in the field can have one or more coaxial terminal patterns anywhere in the interface work area, it becomes very important that the alignment fixture possesses the necessary versatility to accommodate the varying arrangements of contact placement in receivers which are imposed by the end use thereof in the industry.

Like the first alignment bar 42, the second bar 43 has two use modes on the alignment fixture frame and has two distinct longitudinal edge profiles, FIG. 7, including stepped projections 55 and 56 to accommodate the aforementioned two types of receivers. The two edge profiles of the bar 43 facilitate the checking and realignment of all ranks of paddle contacts within the second upper zone of either type of receiver where coaxial terminals 41 are arranged among the paddle contacts 40. As with the first bar 42, it is merely necessary to reverse the alignment bar 43 and advance the second edge longitudinal portion thereof toward the receiver in the second use mode and at the various elevations established by the support grooves 53 and 54. The second upper zone involving the use of the alignment bar 43 is that zone between the vertical bar 28 in its broken line position, FIG. 3, and the right hand side rail 24; and between the top bar 21 of the frame 20 and the alignment bar 43 at the different levels established by grooves 53 and 54.

The entire lower zone of the receiver 34 corresponding to the area in FIG. 3 between the bars 25 and 22 and between the side rails 23 and 24 of frame 20 is serviced by use of the third contact alignment bar 44 and without use of the vertical bar 28, which is separated from the frame 20 and set aside at this time. Between the horizontal bars 25 and 22, FIG. 2, both side rails 23 and 24 have horizontally aligned multiple equidistantly spaced grooves 57 formed in their inner faces and throughout their lengths between the bars 25 and 22. The third alignment bar 44 is equipped at its ends with the aforementioned tongues 47 to engage selectively at different levels in aligned pairs of the grooves 57. The alignment bar 44 is capable of servicing all ranks of paddle contacts in the lower zone of the receiver shown in FIG. 3 simply by successively removing it and reengaging it at the multiple levels of the lower zone within the respective grooves 57.

The third alignment bar 44 is also adapted to be used with both previously-mentioned types of commercial receivers and thus has only one mode of use and one profiled or toothed edge, FIG. 8, and does not require reversing in the fixture frame.

It has not been previously mentioned that at least the longer two alignment bars 42 and 44 are equipped on their bottoms with longitudinally extending support bars 58 anchored to the bars 42 and 44 by screws. The support bars increase the rigidity of the two alignment bars and also aid somewhat in the manipulation thereof. The shorter alignment bar 43 does not require a support bar.

FIGS. 11 through 17 depict more specifically the use or operation of the invention. Referring to these figures, the assembled fixture frame 20 is mounted into the receiver 34 in the same manner that an individual test adapter would be mounted. That is, the elements 38 are placed within the recesses 39′, FIG. 2, and the handle 40′ is turned to activate the cam shaft to a full closed position. This mode of operation is well known in the art. The vertical bar 28 is mounted in the first position of use shown in full lines in FIG. 3. It cannot be installed upside-down because of the unequal sizing of its notches 31, FIG. 5.

With the vertical bar 28 in the first use position, alignment bar 42 is installed, as previously described, in the coacting grooves 45 or 46 with its teeth 48 extending toward the receiver 34. As clearly shown in FIG. 14, the installed alignment bar 42 through its surface A forms an alignment gage for a particular rank of paddle contacts 40. If any contact is twisted as indicated for the contact 40*a*, FIG. 14, this contact is straightened by the use of a bent needle nose pliers, not shown. Such contact is engaged with the pliers behind the paddle radius so as not to mar the radius surface of the contact. The twisted contact is manipulated with the pliers until its radius portion is again parallel with the upper gage surface of the alignment bar 42.

The service man can visually observe the relationship of all contacts 40 in any rank of contacts to the alignment bar. Ideally, the contacts 40 of any rank should have their paddle radius portions lightly touching the alignment bar surface A, as shown in FIG. 16.

If, while moving the alignment bar 42 in or out of the fixture frame, a contact or contacts are elevated above the gaging surface A, the alignment bar could be withdrawn and misaligned paddle contact or contacts 40 forced downwardly toward proper alignment by use of a plastic pencil-like alignment tool T, FIG. 12. Similarly, if, while moving the alignment bar in or out of the fixture frame, contacts are deflected upwardly, the alignment bar is repositioned in the fixture frame, FIG. 13, and the misaligned contact or contacts are adjusted upwardly toward proper alignment by means of the tool T. The adjusting procedures are repeated on successive ranks of contacts 40 until complete servicing of the particular zone of the receiver in the field is completed.

FIGS. 16 and 17 show the relative position of the alignment bar to a contact 40. Surface A of the alignment bar is the true alignment plane. Should the contacts be allowed to register with the surface B, without realigning them so that their paddle radii portions properly register with the true alignment surface A, damage to the contacts at their paddle radii can occur during mating of the individual test adapter, not shown, with the housing receptacle.

Again referring to FIG. 3, to adjust one set of paddle contacts nested among the coaxial terminals in the second upper zone of the first type of receiver, the vertical bar 28 is removed from its first use position near the side rail 24 and reinstalled at the second use position near the center of the frame 20. The bar extensions 33 are gripped by the fingers to aid in manipulating the vertical bar and in overriding the force of the detents 32 holding the vertical bar. With the vertical bar 28 installed in the second position, FIG. 3, the second alignment bar 43 is inserted in the previously-described manner with its edge having the projection 55 facing the receiver. Following this, the contact alignment procedures described above for the first bar 42 are carried out to align successive ranks of contacts. When the second-named type of receiver is to be serviced in the second upper zone, alignment bar 43 is reversed so that its edge carrying projection 56 is toward the receiver, and the adjustment of two sets of paddle contacts nested among coaxial terminals is carried out.

When the upper two zones of the receiver have had their paddle contacts properly aligned by use of the two bars 42 and 43, these alignment bars and the vertical bar 28 are set aside and the third alignment bar 44 is then installed across the lower zone of the receiver and between the side rails 23 and 24 by utilizing the grooves 57 of the side rail. The alignment bar 44 is placed at different levels beginning at the lowermost level until all ranks of contacts across the lower zone of the receiver are adjusted in the manner already described.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. An alignment fixture for use in aligning contacts of receivers in computer interface equipment, comprising a rectangular fixture frame including a middle bar parallel to two members of the frame and extending between the other two members of the frame and fixed thereto, a releasably held movable fixture bar having at least two positions of use on the fixture frame and extending during use at right angles to the middle bar, interengaging means on the movable fixture bar, middle bar and on said frame and releasably holding the movable fixture bar selectively in any of its positions of use on the frame, and a plurality of selectively independently usable contact alignment bars including means enabling them to be mechanically coupled releasably between one member of the frame and one side of the movable fixture bar in parallel relationship to the middle bar while the movable fixture bar is fixed in one position of use on said frame.

2. An alignment fixture as defined in claim 1, and said plurality of selectively independently usable contact alignment bars including a first alignment bar releasably coupled between one side of the movable fixture bar and one member of the frame when the movable fixture bar is in one position of use, and a second alignment bar releasably coupled between the other side of the movable fixture bar and a second member of the frame when the movable fixture bar is in a second position of use on the frame, the first and second alignment bars being of unequal lengths.

3. An alignment fixture as defined in claim 2, and said plurality of selectively independently usable contact alignment bars including a third alignment bar including means enabling it to be mechanically coupled releasably between said one member and second member of the frame in parallel relationship to the middle bar independent of the movable fixture bar.

4. An alignment fixture as defined in claim 2, and each said contact alignment bar having a longitudinal edge profile specifically different from the edge profiles of the other contact alignment bars.

5. An alignment fixture as defined in claim 4, and at least one longitudinal edge portion of each contact alignment bar being stepped to provide thereon a pair of receiver contact gaging surfaces.

6. An alignment fixture as defined in claim 1, and said interengaging means comprising interlocking recesses in spaced relationship on the movable fixture bar, said middle bar and on one member of the frame parallel to the middle bar.

7. An alignment fixture as defined in claim 6, and said recesses of the movable bar being of unequal sizes and the middle bar and said one member of the frame at said recesses being of unequal thickness to preclude improper assembly of the movable bar with said fixture frame.

8. An alignment fixture frame as defined in claim 1, and said interengaging means including yielding detent means on the middle bar and on one member of the frame parallel to the middle bar.

9. An alignment fixture as defined in claim 1, and said last-named means comprising a series of grooves formed in opposite sides of the movable fixture bar, and a similar series of grooves formed in two members of the frame which are parallel to the movable fixture bar.

10. An alignment fixture as defined in claim 9, and said contact alignment bars having tongues formed on their opposite ends adapted for selective engagement in said grooves.

11. An alignment fixture as defined in claim 1, and support elements projecting from opposite sides of said fixture frame and being positively engageable within locator recesses of a coacting receiver.

12. An alignment fixture as defined in claim 9, and the grooves on one side of the movable fixture bar and on the member of the fixture frame facing that side of the movable bar being of the same equal spacing, and the grooves on the other side of the movable fixture bar and on the frame member facing such side being of a different equal spacing, whereby the alignment fixture can accomodate varying arrangements of contact placement in receivers.

13. An alignment fixture as defined in claim 12, and the grooves on said one side of the movable fixture bar and on the member of the fixture facing such side extending for the major portions of the lengths of the movable bar and said member, and the grooves on the other side of the movable fixture bar and on the frame member facing such other side being disposed in a predetermined center region of the movable fixture bar and said last-named member.

14. An alignment fixture as defined in claim 1, and longitudinal finger grip extensions on opposite ends of the movable fixture bar to facilitate separating the movable fixture bar from said fixture frame.

15. An alignment fixture for use in aligning contacts of receivers in a field service procedure comprising a rectangular fixture frame including a middle fixed bar parallel to two members of the frame and extending between the other members of the frame, a releasably held movable fixture bar having at least two positions of use on the fixture frame and extending at right angles to the middle bar and the frame members parallel to the middle bar, interengaging means on the movable fixture bar and on the middle bar and one member of the frame parallel to the middle bar for positively and releasably holding the movable bar in its positions of use on the frame, the movable fixture bar and two members of the fixture frame parallel therewith being grooved along their lengths for the engagement and support in multiple working positions of coacting receiver contact alignment bars, and a plurality of independently usable contact alignment bars for use on the fixture frame including first and second alignment bars engageable with grooves in opposite sides of the movable bar and with grooves of the frame members which are parallel to the movable bar and further including another alignment bar engageable with grooves of the last-mentioned frame members in the absence of said movable bar.

* * * * *